United States Patent [19]

Bialy et al.

[11] Patent Number: 4,556,699

[45] Date of Patent: Dec. 3, 1985

[54] PROCESS FOR THE PRODUCTION OF POLYPHENYLENE OXIDE

[75] Inventors: Jan Bialy; Irena Penczek; Stanislaw Maczenski; Marek Borensztajn, all of Warsaw, Poland

[73] Assignee: Enichimica S.p.A., Milan, Italy

[21] Appl. No.: 677,166

[22] Filed: Dec. 3, 1984

[51] Int. Cl.$^4$ .................... C08G 65/44; C08G 65/46
[52] U.S. Cl. ........................ 526/68; 526/67; 526/69; 526/70; 528/212; 528/214; 528/215; 528/216; 528/217; 528/486
[58] Field of Search ................... 526/67–70; 528/212, 214–217, 486

[56] References Cited

U.S. PATENT DOCUMENTS

| | | | |
|---|---|---|---|
| 4,184,027 | 1/1980 | Hopkins | 526/68 |
| 4,196,278 | 4/1980 | Bennett, Jr. et al. | 528/212 |
| 4,463,164 | 7/1984 | Dalton et al. | 526/69 |
| 4,503,214 | 3/1985 | White et al. | 528/212 |

*Primary Examiner*—Lester L. Lee

[57] ABSTRACT

Process for the production of polyphenylene oxide by means of the oxidative polymerization of 2,6-xylenol, with either oxygen or a gas containing molecular oxygen, in the presence of a catalyst, by continuously operating in a circulation system, and with the precipitation of the polymer in the liquid reaction medium.

7 Claims, 1 Drawing Figure

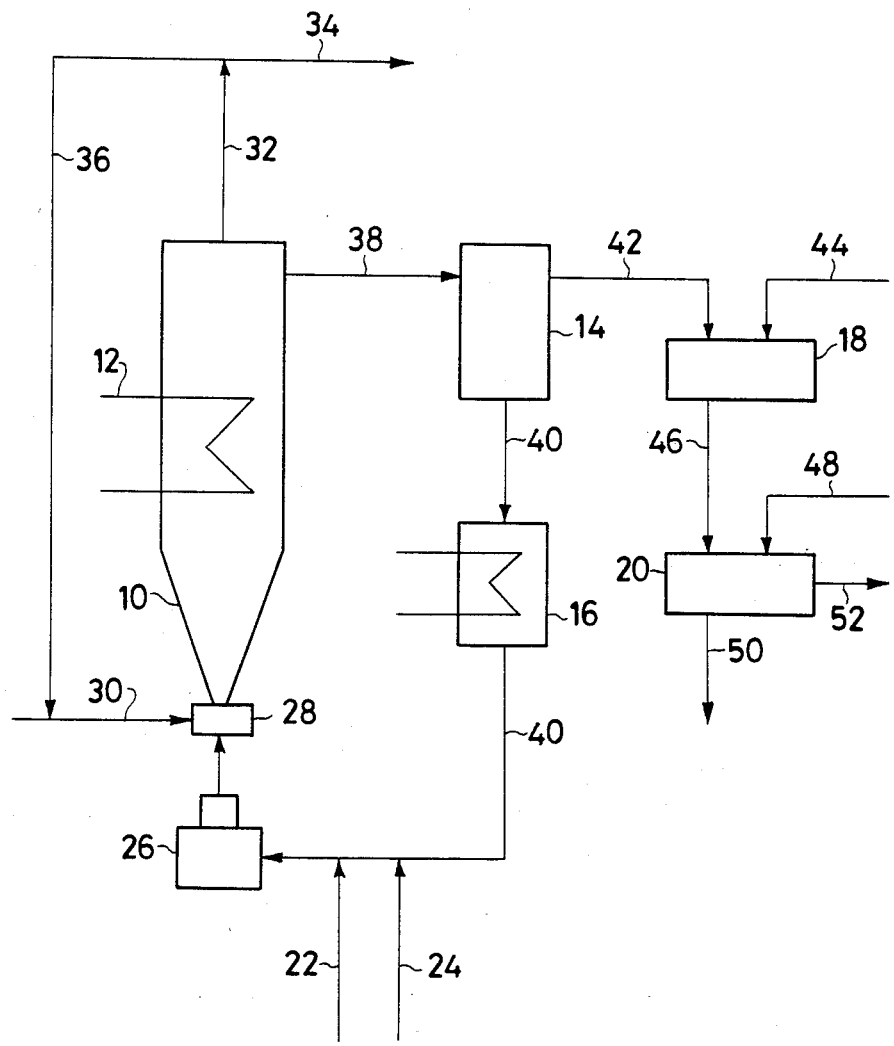

PROCESS FOR THE PRODUCTION OF POLYPHENYLENE OXIDE

The present invention relates to a process for the production of polyphenylene oxide, by continuously operating and with the precipitation of the polymer in the liquid medium of the reaction.

Polyphenylene oxide is a thermoplastic valuable polymer, which is obtained in the art by means of the oxidative polymerization of 2,6-xylenol. Said polyphenylene oxide is used among others, blended with polymers and copolymers of styrene.

According to the technique known, 2,6-xylenol can be polymerized by means of the contact with oxygen, or with a gas containing molecular oxygen, operating in a liquid reaction medium, in which the catalayst, the monomer and the related polymer are soluble. Such a process in the homogeneous liquid phase may also be carried out in a continuous mode, e.g., as disclosed by the U.K. Pat. No. 930,933, and by the U.S. Pat. No. 3,405,092.

The processes carried out in the liquid homogeneous phase suffer from the drawbacks deriving from the viscosity of polymer solutions, from the difficulty of deactivating the catalyst and of withdrawing the deactivated catalyst from such viscous solutions at the end of the polymerization and of the costs and complexity of the operations required to the purpose of separating the polymer and recovering the liquid medium of the reaction.

It is also known to prepare the polyphenylene oxide by polymerizing 2,6-xylenol in a liquid reaction medium in which the monomer and the catalyst are soluble, whilst the polymer is insoluble or substantially insoluble. Such a process is described e.g. in the Polish Pat. No. 57,910, in which the polymerization of 2,6-xylenol is carried out batchwise. A process in the heterogeneous phase, such as that disclosed by the Polish Patent mentioned, allows many of the disadvantages to be overcome, which are typical of the operation in homogeneous phase. However, the fact of operating batchwise makes it difficult to obtain a polyphenylene oxide with constant characteristics from batch to batch. On the other side, the difficulties due to the practical application of a continuous process for the polymerization of 2,6-xylenol in a reaction medium, from which the polyphenylene oxide precipitates, have not allowed up to date such a process to be successfully used on commercial scale.

The purpose of the present invention is therefore a continuous process which, overcoming the difficulties said, allows 2,6-xylenol to be polymerized in a simple and convenient way, by operating in a liquid reaction medium, in which the polyphenylene oxide precipitates during the polymerizing course.

In particular, according to the present invention polyphenylene oxide is prepared by oxidative polymerization of 2,6-xylenol, with oxygen or a gas containing molecular oxygen, in the presence of a catalyst, in a liquid reaction medium, in which the catalyst and the monomer are soluble, and the polyphenylene oxide is insoluble or substantially insoluble, by means of a process, in which:

the catalyst and the monomer are continuously fed in to the bottom of a vertical and elongated reaction vessel, dissolved in a liquid solvent, or in a mixture of liquid solvents, incapable of dissolving the polyphenylene oxide;

a gaseous stream of oxygen, or of a gas containing molecular oxygen is continuously fed in to the bottom of said reaction vessel;

at the top of said reaction vessel a dispersion is continuously recovered of solid polyphenylene oxide in the relevant liquid reaction mixture;

a portion of said dispersion is continuously recycled and is fed in, together with the catalyst and 2,6-xylenol, into the relevant solution, at the bottom of said reaction vessel, maintaining a weight ratio between the recycled portion and the fresh feed of at least 100/1;

the polyphenylene oxide is recovered from the residual portion of the dispersion recovered at the top of the reactor;

the thermal effect of the polymerization is controlled by means of heat exchange inside and/or outside the polymerization reactor.

The catalyst usually employed for the polymerization of 2,6-xylenol is cupric chloride, conveniently as a complex with an organic base, such as morpholine.

The liquid medium used for the polymerization is capable of dissolving 2,6-xylenol, as well as the complex catalyst, but is incapable, or substantially incapable, of dissolving polyphenylene oxide. Liquid reaction media suitable to the purpose are mixtures of aromatic hydrocarbons and aliphatic alcohols, and preferably a blend of toluene and ethanol.

The cupric chloride complexed with the organic base and the 2,6-xylenol are fed to the polymerization reactor as solutions, preferably separated solutions, in a liquid solvent, which is preferably the same solvent used as the liquid reaction medium.

To the reactor also a gaseous stream is fed in, of oxygen, or of a gas containing molecular oxygen, e.g., air, in a quantity equivalent to, or slightly in excess of the stoichiometric quantity required for the oxidative polycondensation reaction of 2,6-xylenol.

The exothermic character of the reaction is controlled by means of heat exchangers, so as to keep the temperature of the reaction mixture at values constantly lower than about 35° C.

According to the present invention, the process is carried out by means of a cyclic reaction system, in which the reaction products, drawn from the top of the reactor, are partly recycled to the bottom of the reactor, where they are fed in together with the solution containing the catalyst and the 2,6-xylenol. In particular, weight ratios are maintained of the recycled fraction and the fresh feed, of at least 100/1.

Moreover, the feeding rate of the mixture into the reactor, measured as linear speed of the same mixture at the inlet of the reaction vessel, is held at a value of at least 1 meter/second. To this purpose, an ejector may be used, provided with a nozzle. Finally, the gaseous stream of the oxygen, or of the gas containing molecular oxygen, is fed in, in correspondance of said ejector. By operating under these conditions, turbulent conditions are maintained inside the reactor of the reactant mass, a good control is guaranteed of the temperature of the same mass, and the problems are solved relative to the distribution of gaseous oxygen inside said mass, thus guaranteeing the homogeneity of the polymerization reaction, and the safety conditions, in that, as it is well known, large bubbles of oxygen may cause explosion phenomena.

For a better understanding of the process of this invention, reference is made to the FIGURE of the enclosed drawing.

In this FIGURE, by (24) the feeding line is shown of 2,6-xylenol solution, and by (22) the feeding line is shown of the solution of the catalyst complexed with the organic base. These two solutions, mixed with the reaction mixture outcoming from line (40), are fed through the circulation pump (26) to the nozzle (28) at the bottom of the polymerization reactor (10). To the nozzle (28) also a stream of oxygen, or of gas containing molecular oxygen, is fed, by the line (30).

The mixture escaping from nozzle (26) enters the reactor of elongated shape (10), of tapered shape in its lower portion, where the polymerization takes place of 2,6-xylenol within the mass kept under turbulent conditions. In the heat exchanger (12) at least a part of the heat is released, which is developed during the polymerization. The possibly in excess gas is purged from the reactor (10) through the line (22), atop of the same reactor, and is discharged by the line (34), or recycled, partly or totally, by the line (36). The reaction mixture is drawn laterally, in the nearby of the top of the reactor (10), by the line (38), and sent to the tank (14). A portion of such mixture is recycled to the bottom of reactor (10), through the line (40), after a preliminary possible heat exchange in heat exchanger (16).

The residual portion of the reaction mixture is drawn by the line (42) and sent to the tank (18), where the catalyst is decomposed, e.g., by means of an acid, fed in by the line (44). After this treatment, the reaction mixture is sent by the line (46) to the centrifuge (20), to which also alcohol is fed by the line (48). From the centrifuge (20) the solid polyphenylene oxide is separated by the line (50) from the liquid reaction and washing medium, which is discharged by the line (52).

By operating according to the process of this invention, the obtainment is possible of a polyphenylene oxide with constant molecular weight, as an easily separable solid. The concentration of the polymer in the reaction medium, moreover, results to be at least twice as large as that technically useable in the processes in homogeneous phase. Moreover, by operating according to the process of this invention, high polymerizing rates are obtained, with a practically complete consumption of the oxygen fed in.

The following experimental Examples are illustrative and not limitative of the invention.

EXAMPLE 1

Referring to the enclosed FIGURE, a solution is fed in (line 24) having the following composition:

| Toluene | 50 parts by wt |
| ethanol | 25 parts by wt |
| 2,6-xylenol | 38 parts by wt |
| polystyrene | 0,2 pts by wt | at a rate of 0.01 m³/hour. A solution is moreover fed in (line 22), having the composition:

| Toluene | 50 parts by wt |
| ethanol | 25 parts by weight |
| morpholine | 8,8 pts by wt |
| cupric chloride | 0,15 pts by wt | at a rate of 0.01 m³/hour. The oxygen is introduced (line 30) in a slightly larger quantity than stoichiometric.

The reaction mixture is partly recycled (line 40) and fed in to the reactor (10) of 0.12 m³ of capacity, together with the solution of the monomer and of the catalyst, by means of the recycle pump (26), at a total rate of 8 m³/hour. The linear speed of the mixture at the inlet of the reactor (10) is of about 1.5 m/sec. The reaction temperature is maintained at 28°–32° C. by means of the heat exchangers (12, 16), having an exchange surface of 1 m².

The recovered portion of reaction mixture (line 42) is treated with acetic acid to pH 7 (vessel 18).

The polyphenylene oxide is washed with ethanol and centrifuged (centrifuge 20).

A quantity of 2.77 kg/hour is obtained on the average of polyphenylene oxide with an intrinsic viscosity of 0.5 dl/g, measured at 25° C. in chloroform.

EXAMPLE 2

The process is carried out as described in Example 1, feeding in a solution having the following composition:

| Toluene | 100 parts by weight |
| ethanol | 50 parts by weight |
| morpholine | 8,8 pts by wt |
| cupric chloride | 0,15 pts by wt |
| polystyrene | 0,2 pts by wt |
| 2,6-xylenol | 38 parts by weight |

This solution, together with the recycled reaction mixture is fed in to the polymerization reactor by a pump equipped with an ejector at a volume rate of 10 m³/hour and with a linear speed, measured at the inlet of the reactor, of about 1.5 m/s. The reaction temperature is controlled at 28°–30° C. The not recycled portion of the reaction mixture is treated with acetic acid to pH 8.

An average quantity is obtained of 42 parts by weight of polyphenylene oxide with intrinsic viscosity of 0.49 dl/g, measured at 25° C. in chloroform.

We claim:

1. Process for the preparation of polyphenylene oxide by means of polymerization of 2,6-xylenol, with oxygen, or with a gas containing molecular oxygen, in the presence of a catalyst, within a liquid reaction medium in which the catalyst and the monomer are soluble, and polyphenylene oxide is insoluble or substantially insoluble, characterized in that:
   (a) to the bottom of a vertical and elongated reaction vessel monomer and an amount of the catalyst effective to polymerize the monomer is continuously fed dissolved in a liquid solvent, or in a mixture of liquid solvents, incapable of dissolving the polyphenylene oxide;
   (b) to the bottom of said reaction vessel a gaseous stream of oxygen, or of gas containing molecular oxygen is continuously fed in while maintaining the temperature below 35° C. by using a heat exchanger;
   (c) at the top of said reaction vessel, recovering a dispersion of solid polyphenylene oxide in the liquid reaction mixture;
   (d) recovering a portion of said dispersion, with the catalyst and the 2,6-xylenol,, and recycling such portion to the bottom of said reaction vessel while maintaining a weight ratio of the recycled portion to the fresh feed of at least 100/1; and (e) recovering the polyphenylene oxide from the remaining portion of said dispersion that is recovered from the top of the reaction vessel.

2. Process as claimed in claim 1, characterized in that the mixture is fed in to the bottom of the reaction vessel at a linear speed, measured at the inlet of the rector, of at least 1 meter/second.

3. Process as claimed in claim 2, characterized in that said mixture is fed in through an injector provided with a nozzle, to the injector the gaseous stream being additionally fed in of the oxygen or of the gas containing molecular oxygen.

4. Process as claimed in claim 1, characterized in that the catalyst is cupric chloride, complexed with morpholine.

5. Process as claimed in claim 1, characterized in that the liquid reaction medium is a mixture of an aromatic hydrocarbon and of an aliphatic alcohol.

6. Process as claimed in claim 5, characterized in that said liquid reaction medium is a mixture of toluene and ethanol.

7. Process as claimed in claim 1, characterized in that the polyphenylene oxide is recovered by treating its suspension in the liquid reaction medium by means of acetic acid, and then centrifuging the polyphenylene oxide while it is being washed with ethanol.

* * * * *